ent [19]

United States Patent [19]

Bost

[11] 4,026,810

[45] May 31, 1977

[54] INTUMESCENT FLAME RETARDANTS

[75] Inventor: Howard W. Bost, Bartlesville, Okla.

[73] Assignee: Phillips Petroleum Company, Bartlesville, Okla.

[22] Filed: Mar. 2, 1976

[21] Appl. No.: 663,006

[52] U.S. Cl. .............................. 252/8.1; 106/15 FP; 106/177; 252/188.3 R; 252/401; 252/403; 252/404; 252/405; 252/407; 260/2.5 FP; 260/42.45; 260/45.7 P; 260/45.85 R; 260/45.9 NP; 260/45.95 L; 260/45.9 R; 260/849

[51] Int. Cl.$^2$ ........................................ C09K 3/28

[58] Field of Search ......................... 106/15 FP, 177; 252/8.1, 4, 5, 401, 403, 404, 405, 407, 188.3 R; 260/45.7 P, 45.85, 45.9 NP, 45.95, 45.9 R, 2.5 FP, 849, 42.45

[56] References Cited

UNITED STATES PATENTS

| | | | |
|---|---|---|---|
| 2,600,455 | 6/1952 | Wilson et al. | 106/15 FP |
| 2,692,203 | 10/1954 | Klein et al. | 106/15 FP |
| 2,784,159 | 3/1957 | Fluck et al. | 106/15 FP |
| 3,253,881 | 5/1966 | Donahue | 252/8.1 |
| 3,398,019 | 8/1968 | Langguth et al. | 106/15 FP |
| 3,479,211 | 11/1969 | Goldstein | 106/15 FP |
| 3,513,114 | 5/1970 | Hahn et al. | 252/8.1 |
| 3,654,190 | 4/1972 | Levine | 252/5 |
| 3,810,862 | 5/1974 | Mathis et al. | 260/42.45 |
| 3,839,239 | 10/1974 | Godfried | 260/47 EP |
| 3,955,987 | 5/1976 | Schaar et al. | 252/8.1 |

FOREIGN PATENTS OR APPLICATIONS 755,551  8/1956  United Kingdom ............ 106/15 FP

*Primary Examiner* — Benjamin R. Padgett
*Assistant Examiner* — T. S. Gron

[57] ABSTRACT

The color of a cured intumescent flame retardant is improved by incorporating a suitable alcohol, carboxylic acid or amine into the composition prior to curing the composition.

29 Claims, No Drawings

INTUMESCENT FLAME RETARDANTS

This invention relates to flame retardants. More particularly, this invention relates to a non-halogenated flame retardant suitable for incorporation into synthetic polymers.

Fire safety rules have increasingly affected the market for flammable plastics. Many plastics can be made flame retardant by incorporating therein a halogenated organic material which, on heating, produces an inert gas which dilutes the flammable gases produced by the heated polymer so that they are not within the combustible range. However, consumer alarm over the possible release of toxic gases during combustion of such flame-retarded plastics has spurred development of other non-halogenated flame retardant additives and flame retardant systems.

Intumescent flame retardants have been developed as alternatives for the halogenated flame retardants. These flame retardants, upon heating, promote the formation of char which protects the base polymer by providing insulation from heat and oxidative degradation. However, incorporation of intumescent flame retardants within thermoplastics has generally been precluded due to void formation during processing caused by triggering of the gas generating "intumescent reaction" between the components of the flame retardant at processing temperature. Consequently, such intumescent flame retardants must be used as coatings rather than incorporated into the plastics. However, such coatings can be lost if melting of the plastic during combustion carries away the coating from the surface to be protected.

An intumescent flame retardant has been developed which can be incorporated in a thermoplastic prior to molding. This flame retardant is prepared by reacting, for example, phosphoric oxide, phosphoric acid, pentaerythritol and melamine and thereafter curing the reaction product by heating to evolve gaseous products. This gas evolving step, i.e., curing step, does not fully deplete the gas generating capability of the flame retardant system; thus, at combustion temperatures, further reaction can occur to provide foaming and charring.

It was found, however, that the intumescent flame retardant described above, had a moderate to dark brown color after curing. Such color undesirably tints the thermoplastic material into which the intumescent flame retardant is incorporated.

Accordingly, it is an object of this invention to provide a cured intumescent flame retardant of improved color.

Other objects, aspects and advantages of this invention will be apparent to those skilled in the art from a reading of the following disclosure and appended claims.

In accordance with the present invention, it has now been found that undesirable color formation during the preparation of a cured intumescent flame retardant can be minimized by blending with the retardant composition, prior to curing, a minor amount of a suitable alcohol, carboxylic acid or amine color improver compound.

Thus, according to the present invention, there is provided a method for improving the color of a cured intumescent flame retardant by incorporating therein a color improver compound. There is also provided a cured intumescent flame retardant having improved color.

The intumescent flame retardant of this invention is a highly cross-linked polymer prepared by the initial condensation of a polyol having from 5 to 15 carbon atoms per molecule and from 4 to 8 hydroxyl groups per molecule with a phosphorus oxide compound of the formula $P_2O_5 \cdot xH_2O$ wherein $x$ is a number in the range of 0 to 3, followed by the addition of a nitrogen compound such as melamine and curing. The color improver of this invention is added to the composition prior to the curing step. After curing, the mixture is cooled and ground to a particle size suitable for incorporation into thermoplastic materials.

The intumescent flame retardant described above is improved by incorporating therein at least one color improver of the formula $$R - Y_z$$

having 1 to 25 carbon atoms per molecule, wherein Y is selected from the group consisting of —OH, —COOH and —NR'$_2$, $z$ is a number having a value of 1, 2 or 3, R is an organic radical having a valence of $z$ selected from the group consisting of alkyl, cycloalkyl, alkoxy, aryl and combinations thereof such as alkaryl, aralkyl, cycloalkylaryl, aralkoxy, alkoxyaryl and the like, and R' is selected from the group consisting of —H and —R. One of the R' groups can be joined to the R group to form a heterocyclic ring.

Some specific examples of suitable alcohol compounds are methanol, 2-ethylhexanol, 4-tetradecanol, 1-octadecanol, carnaubyl alcohol, ethylene glycol, triethylene glycol, benzyl alcohol, cyclohexanol, and the like and mixtures thereof.

Some specific examples of suitable acids are formic, acetic, pentanoic, adipic, decanoic, stearic, benzoic, p-toluic, dodecanedioic, eicosanoic, cyclopentanecarboxylic, and the like and mixtures thereof.

Some specific examples of suitable amines are trimethylamine, dibutylamine, 2-ethylhexylamine, octadecylamine, aniline, hexamethylethylenediamine, 2-octylcyclohexylamine, decyldimethylamine, benzylamine, o-tolylamine, piperidine, and the like and mixtures thereof.

Those skilled in the art will appreciate that those alcohols, acids or amines of relatively low molecular weight require closed systems to prevent their loss before they can be chemically incorporated into the flame retardant composition.

In a presently preferred embodiment, the color improver compounds described above have from 6 to 20 carbon atoms per molecule. In a more preferred embodiment, the radical R is alkyl, alkoxy, cycloalkyl or aralkyl since those compounds in which the functional group Y is attached directly to an aromatic ring generally increase the smoke formation on burning.

The phosphorus oxide compounds which are suitable for use in the present invention are those compounds having the formula $P_2O_5 \cdot xH_2O$, wherein $x$ has a value of 0 to 3. These compounds include, for example, phosphorus pentoxide, orthophosphoric acid, and condensed phosphoric acids having from about 70 to about 99, preferably about 80 to about 90, weight percent, phosphorus pentoxide. Such condensed phosphoric acids can be prepared by a technique known in the art. A mixture of phosphorus pentoxide and orthophosphoric acid has been found to be particularly effective.

The polyols which are suitable for use in the present invention are saturated, acyclic polyols of 5 to 15 carbon atoms and 4 to 8 hydroxyl groups per molecule. Preferably, in addition to the carbon, hydrogen and hydroxyl groups, the only other functional groups in the polyols are a maximum of two other linkages per molecule. Examples of suitable polyols include sorbitol, mannitol, pentaerythritol, dipentaerythritol and tripentaerythritol.

Melamine is generally employed as the nitrogen compound in preparing the intumescent flame retardants of this invention. It will be apparent to those skilled in the art that other nitrogen compounds such as dicyandiamide, urea, dimethylurea and the like, can be used in place of the melamine.

The above-described ingredients which are suitable for use in preparing the flame retardant composition of this invention are combined in amounts as follows:

| Ingredient | Parts by Weight per 100 parts by Weight of Reaction Mixture | |
|---|---|---|
| | Broad | Preferred |
| Phosphorus oxide Compound | 10–75 | 15–50 |
| Polyol | 5–40 | 10–25 |
| Nitrogen compound | 10–70 | 15–50 |
| Color improver | 0.5–20 | 2–10 |

Preparation of the intumescent flame retardant of this invention is hereinafter described in terms of a mixture of phosphoric acid and phosphorus pentoxide as the phosphorus oxide compound, melamine as the nitrogen compound, and pentaerythritol as the polyol. Accordingly, these ingredients can be combined in amounts as follows:

| Ingredient | Parts by Weight per 100 parts by Weight of Reaction Mixture | |
|---|---|---|
| | Broad | Preferred |
| Phosphoric acid | 0.5–25 | 5–15 |
| Phosphorous pentoxide | 10–75 | 15–50 |
| Pentaerythritol | 5–30 | 10–25 |
| Melamine | 10–70 | 15–50 |
| Color improver | 0.5–20 | 2–10 |

To prepare the intumescent flame retardant composition, the above-described ingredients are combined in any suitable manner, at a temperature and for a time sufficient to provide a composition which, when incorporated into a thermoplastic resin, will impart flame retardant properties to that resin. Generally, preparation of the flame retardant can be conveniently carried out as follows:

Step I: The phosphoric acid and phosphorus pentoxide are mixed, allowing an autogenous increase in temperature resulting from the exothermic reaction. The reaction period can vary broadly from about 5 to 20 minutes.

Step II: The pentaerythritol, the color improver, and about 5–15 percent of the melamine are added, with stirring, to the mixture produced in Step I, at a temperature in the range of 75°–150° C for about 0.5–8 hours, preferably about 110°–130° C for about 0.5–4 hours.

Step III: The balance of the melamine is added with stirring, to the mixture produced in Step II. The melamine can be added continuously or intermittently over a period of about 0.1–3 hours or more, at a temperature of about 180°–300° C, preferably about 0.1–1.5 hours at about 200°–250° C.

Step IV: The reaction mixture obtained from Step III is cured by continued heating, with stirring, at a temperature of about 200°–300° C for about 1–5 hours, preferably 240°–270° C for about 2–3 hours.

Step V: The reaction mixture from Step IV is cooled, then pulverized to a suitable particle size.

Exclusion of oxygen from the reaction mixture during the curing Step IV and the cooling and pulverizing Step V generally results in a further improvement in color quality of the finished flame retardant. Oxygen can be excluded by maintaining an inert atmosphere, such as nitrogen or helium, or by maintaining a reduced pressure over the reaction mixture. It is presently preferred that the entire preparation of the intumescent flame retardant composition be carried out in the absence of oxygen.

The thermoplastic polymers into which the intumescent flame retardant compositions of the present invention can be incorporated include olefin homopolymers, olefin copolymers, styrene resins, acrylonitrile-butadiene-styrene resins, and blends thereof. The olefin polymers are prepared from 1-olefins having from 2 to 8 carbon atoms per molecule. The flame retardant compositions are particularly suitable for incorporation into normally solid molding grade olefin polymer resins.

Examples of normally solid thermoplastic polymers suitable for use in the present invention are polyethylene, polypropylene, copolymers of propylene with minor amounts of ethylene, copolymers of ethylene with minor amounts of other 1-olefins such as 1-butene or 1-hexene, copolymers containing substantial amounts of ethylene and propylene having some elastomeric character such as ethylene-propylene rubber (EPR), polystyrene, terpolymers of acrylonitrile-butadiene-styrene and the like and blends thereof.

The flame retardant compositions are incorporated into the thermoplastic polymers using any convenient method which will uniformly distribute the flame retardant composition throughout the plastic and impact flame retardant properties thereto. This can be accomplished by conventional milling procedures in which the flame retardant composition is milled into the plastic at or above the softening or melting point of the plastic, such as by hot roll mills or heated internal mixers.

The amount of flame retardant composition incorporated into the thermoplastic material will be that amount sufficient to achieve the degree of flame retardancy desired. Since the response to the flame retardant composition may vary with the specific thermoplastic material into which it is incorporated, the amount of flame retardant will generally be within the range of about 10 to about 50 parts by weight per 100 parts of thermoplastic material.

Other conventional additives such as pigments, fillers, antioxidants, and the like can also be incorporated into the final composition. Additionally, other flame retardant compositions or flame retardant adjuvants such as antimony oxide, ethylene diamine dihydrobromide and the like can also be present.

The following examples illustrate the invention:

EXAMPLE I

Preparation of Intumescent Flame Retardant Compositions

In each of the flame retardant preparation runs tabulated below, phosphoric acid (85%) was added slowly, with stirring, to phosphorus pentoxide. The moderate flow of nitrogen was kept over the mixture at all times. A mixture of pentaerythritol, the indicated color improver compound, and 5–15 weight percent of the total amount of melamine was then added, in small increments, also with stirring. The temperature of the reaction mixture was raised to about 120° C and maintained there for about 3 hours.

The balance of the melamine was then added, in small portions with stirring, as the temperature was raised over a period of about 1 hour to about 250° C. The reaction mixture was then maintained at a temperature of about 250°–265° C for 2–3 hours during which time curing of the flame retardant composition took place.

When the reaction mixture was adequately cooled, generally after standing overnight still under a flow of nitrogen, it was removed from the reaction and pulverized in a blender to pass through an 80-mesh sieve. The essential conditions and results of these runs are shown in Table I.

EXAMPLE II

To illustrate that color improvements of the flame retardant composition would carry through into the resin into which the composition was incorporated with no loss of flame retardancy, several compositions shown in Table I were incorporated into a polymer blend consisting of 42.5% polypropylene (12 melt flow), 30% polyethylene (18 melt flow) and 27.5% of a commercial ethylene-propylene-rubber (Exxon Vistalon 606 EPR), by weight and tested for fire retardancy as well as being examined for color.

The flame retardant compositions were incorporated into the polymer blend by mixing on a steam-heated roll mill maintained at about 168°–178° C. The polymers were blended together on the roll mill first. The flame retardant composition was then slowly milled into the polymer blend. After completion of the addition of the flame retardant, the milling was continued for 4.5 minutes to disperse the retardant throughout the polymer.

Table I

| Run No. | Preparation of Intumescent Flame Retardants | | | | | Product | |
|---|---|---|---|---|---|---|---|
| | $P_2O_5$ g | $H_3PO_4$ (85%) g | Pentaerythritol, g | Melamine, g | Color Improver, g | g | Color |
| 1 | 141 | 46.5 | 81.6 | 151.5 | none | 360 | brown |
| 2 | 141 | 46.5 | 81.6 | 151.5 | none | 369 | tan |
| 3 | 141 | 46.5 | 81.6 | 151.5 | none | 365 | dk. tan |
| 4 | 141 | 46.5 | 74.1 | 151.5 | ODA, 15 | 400 | off-white |
| 5 | 141 | 46.5 | 79.7 | 151.5 | ODA, 15 | 410 | off-white |
| 6 | 141 | 46.5 | 72.1 | 151.5 | ODA, 75 | 438 | lt. tan |
| 7 | 141 | 46.5 | 78.7 | 151.5 | ODA, 15 | 348 | off-white |
| 8 | 141 | 46.5 | 81.6 | 151.5 | ODA, 15 | 408 | v. lt. tan |
| 9 | 141 | 46.5 | 79.7 | 151.5 | ODA, 15 | 411 | off-white |
| 10 | 141 | 46.5 | 74.7 | 151.5 | ODA, 15 LA, 15 | 382 | tan |
| 11 | 141 | 46.5 | 73.0 | 151.5 | ODA, 15 TEG, 15 | 415 | lt. tan |
| 12 | 141 | 46.5 | 81.6 | 151.5 | SA, 15 | 413 | off-white |
| 13 | 141 | 46.5 | 81.6 | 151.5 | SA, 15 | 410 | v. lt. tan |
| 14 | 141 | 45.8 | 81.6 | 151.5 | SA, 15 | 345 | off-white |
| 15 | 141 | 45.4 | 81.6 | 151.5 | SA, 15 DiC$_{12}$, 15 | 317 | lt. tan |
| 16 | 141 | 45.4 | 81.6 | 151.5 | SA, 15 AA, 15 | 415 | yellow-tan |
| 17 | 142 | 46.5 | 81.6 | 151.5 | SA, 25 | 403 | tan |
| 18 | 142 | 46.5 | 81.6 | 151.5 | SA, 15 | 414 | off-white |
| 19 | 141 | 46.5 | 81.6 | 151.5 | OAM, 15 | 417 | off-white |
| 20 | 141 | 46.5 | 81.6 | 151.5 | OAM, 15 | 419 | lt. tan |

ODA = Octadecanol
TEG = Triethylene Glycol
DiC$_{12}$ = Dodecanedioic Acid
LA = Lauryl Alcohol
SA = Stearic Acid
AA = Adipic Acid
OAM = Octadecylamine Runs 1–3 in Table I illustrate typical results obtained in the absence of a color improver. The color of such preparation is generally dark ranging from a tan to a brown.

Runs 4–11, on the other hand, illustrate the results obtained when various amounts of long-chain alcohol color improvers are incorporated into the flame retardant composition. While varying slightly from batch to batch the color of these invention runs is seen to be significantly lighter than that of control runs 1–3. Similarly, invention runs 12–18 which employ various long-chain carboxylic acids are also shown to produce flame retardant compositions of a lighter color than that of control runs 1–3. In invention runs 19–20, the long-chain amine, octadecylamine, is also shown to be effective in reducing color in the flame retardant composition.

After hot roll milling, a portion of the polymer blend containing the flame retardant composition, was compression-molded into "picture frame" molds. Approximately 25g of the retarded polymer blend was placed in a 5 inch by 2.5 inch by ⅛ inch frame and heated to about 177° C under about 25 tons platen pressure. These samples were cut into 5 by ½ inch strips for UL-94 tests. Two of these strips were further cut into 5 by ¼ inch strips for oxygen index (O.I.) tests.

The essential conditions and results of these tests are shown in Table II below:

Table II

| Performance of Flame Retardants in Polymer Blends | | | | |
|---|---|---|---|---|
| Flame Retardant | | Polymer Blend | | |
| Run No.[a] | Color Improver | Loading phr | Blend Color | Flame UL-94[b] | Retardancy O.I.[c] |
| 2 | None | 40 | dk. brown | V-O | 26.0 |
| 9 | Octadecanol | 40 | lt. tan | V-O | 27.8 |

Table II-continued

Performance of Flame Retardants in Polymer Blends

| Flame Retardant | | Polymer Blend | | |
|---|---|---|---|---|
| Run No.[a] | Color Improver | Loading phr | Blend Color | Flame UL-94[b] | Retardancy O.I.[c] |
| 18 | Stearic Acid | 40 | lt. tan | V-O | 28.0 |
| 20 | Octadecylamine | 40 | tan | V-O | 26.0 |

[a]Refers to Run Nos. of Table I.
[b]Underwriters Laboratory Bulletin 94 (UL-94), Vertical Burning Test. See also Modern Plastics, October 1970, p. 92 and see also Modern Plastics Encyclopedia, e.g., 1973–74, Vol. 50, No. 10A, p. 655A. A rating of V-O means burning of specimen ceases in 5 seconds or less and releases no flaming particles or drops.
[c]Oxygen Index Test. See Modern Plastics, p. 141, Nov. 1966. Briefly, this is a measure of the minimum percentage of oxygen required in an oxygen-nitrogen mixture that will just sustain combustion of a vertically mounted specimen that has been ignited at its upper end. Thus, high O.I. values are desirable.

Examinations of data in Table II clearly show that the incorporation of these alcohols, acids, or amines into the flame retardant composition not only improved the color of the flame retardant but also improved the color of the polymer compositions into which the retardants were subsequently incorporated. Moreover, it is seen from the UL-94 and O.I. tests that this improvement in color was obtained at no sacrifice of flame retardant properties for the final composition.

Reasonable variations and modifications, which will be apparent to those skilled in the art, can be made in this invention without departing from the spirit and scope thereof.

What is claimed is:

1. A method for improving the color of a cured intumescent flame retardant composition comprising (A) the initial condensation of a polyol having from 5 to 15 carbon atoms per molecule and from 4 to 8 hydroxyl groups per molecule in an approximate amount ranging from 5 to 40 parts with a phosphorus oxide compound of the formula $P_2O_5 \cdot xH_2O$ wherein $x$ is a number in the range of 0 to 3 in an approximate amount ranging from 10 to 75 parts in the presence of 5 to 15 percent of an approximate amount ranging from 10 to 70 parts of a nitrogen compound selected from the group consisting of melamine, dicyandiamide, urea and dimethylurea, and a color improving amount of a color improving compound; (B) the addition to the mixture of step (A) of the balance of said nitrogen compound over a period of about 0.1–3 hours or more at a temperature of about 180°–300° C; and (C) thereafter curing by heating the reaction mixture of step (B) to evolve gaseous products, said color improving compound being of the formula $R-Y_z$ having from 1 to 25 carbon atoms per molecule, wherein Y is selected from the group consisting of —OH, —COOH and —NR'$_2$, $z$ is a number having a value of 1, 2 and 3, R is an organic radical having a valence $z$ selected from the group consisting of alkyl, cycloalkyl, alkoxy, aryl and combinations thereof, and R' is selected from the group consisting of —H and —R, wherein one of said R' groups can be joined with said R group to form a heterocyclic ring.

2. The method of claim 1 wherein said color improver has from 6 to 20 carbon atoms per molecule.

3. The method of claim 1 wherein said color improver has from 6 to 20 carbon atoms per molecule and said R is alkyl.

4. The method of claim 1 wherein said color improver is a carboxylic acid.

5. The method of claim 1 wherein said color improver is an alcohol.

6. The method of claim 1 wherein said color improver is an amine.

7. The method of claim 1 wherein said phosphorus oxide compound is employed in an approximate amount ranging from 10 to 75 parts, said nitrogen compound is employed in an approximate amount ranging from 10 to 70 parts, said polyol is employed in an approximate amount ranging from 5 to 40 parts and said color improving compound is employed in an approximate amount ranging from 0.5 to 20 parts.

8. The method of claim 7 wherein said phosphorus oxide compound is a mixture of phosphoric acid and phosphorus pentoxide, said polyol is pentaerythritol and said nitrogen compound is melamine.

9. The method of claim 1 wherein said color improving compound is octadecanol.

10. The method of claim 1 wherein said color improver is lauryl alcohol.

11. The method of claim 1 wherein said color improver is triethylene glycol.

12. The method of claim 1 wherein said color improver is stearic acid.

13. The method of claim 1 wherein said color improver is dodecanedioic acid.

14. The method of claim 1 wherein said color improver is adipic acid.

15. The method of claim 1 wherein said color improver is octadecyl amine.

16. The method of claim 8 wherein
   A. said phosphoric acid and said phosphorus pentoxide are mixed, allowing an autogenous increase in temperature.
   B. said pentaerythritol, said color improver and the portion of said melamine are added, with stirring, to the mixture produced in step (A), at a temperature in the range of 75°–150° C for about 0.5–8 hours,
   C. the balance of said melamine is added, with stirring, to the mixture produced in step (B) over a period of about 0.1–3 hours at a temperature of about 180°–300° C,
   D. The reaction mixture obtained from step (C) is cured by continued heating, with stirring at a temperature of about 200°–300° C for about 1–5 hours, and
   E. the reaction mixture from step (D) is cooled, then pulverized to a suitable particle size.

17. A cured intumescent flame retardant prepared according to the method of claim 1.

18. The product of claim 17 wherein said phosphorus oxide compound is employed in an approximate amount ranging from 10 to 75 parts, said nitrogen compound is employed in an approximate amount ranging from 10 to 70 parts, said polyol is employed in an approximate amount ranging from 5 to 40 parts and said color improver is employed in an approximate amount ranging from 0.5 to 20 parts.

19. The product of claim 18 wherein said phosphorus oxide compound is a mixture of phosphoric acid and phosphorus pentoxide and said polyol is pentaerythritol, and said nitrogen compound is melamine.

20. The product of claim 17 wherein said color improver is an alcohol.

21. The product of claim 17 wherein said color improver is a carboxylic acid.

22. The product of claim 17 wherein said color improver is an amine.

23. The product of claim 20 wherein said color improver is octadecanol.

24. The product of claim 20 wherein said color improver is lauryl alcohol.

25. The product of claim 20 wherein said color improver is triethylene glycol.

26. The product of claim 21 wherein said color improver is stearic acid.

27. The product of claim 21 wherein said color improver is dodecanedioic acid.

28. The product of claim 21 wherein said color improver is adipic acid.

29. The product of claim 22 wherein said color improver is octadecylamine.

* * * * *